US011397095B2

(12) United States Patent
Shepheard et al.

(10) Patent No.: US 11,397,095 B2
(45) Date of Patent: Jul. 26, 2022

(54) ELECTRONIC DISTANCE RECORDER

(71) Applicant: NAVMAN WIRELESS NEW ZEALAND, Hamilton (NZ)

(72) Inventors: Robert Andrew Carr Shepheard, Auckland (NZ); Darren Parker, Auckland (NZ); Jane Plowman, Auckland (NZ); Norman Ballard, Soldiers Point (AU); Richard Stanton, Auckland (NZ)

(73) Assignee: NAVMAN WIRELESS NEW ZEALAND, Hamilton (NZ)

( * ) Notice: Subject to any disclaimer, the term of this patent is extended or adjusted under 35 U.S.C. 154(b) by 842 days.

(21) Appl. No.: 16/065,569

(22) PCT Filed: Dec. 23, 2016

(86) PCT No.: PCT/NZ2016/050205
§ 371 (c)(1),
(2) Date: Jun. 22, 2018

(87) PCT Pub. No.: WO2017/111620
PCT Pub. Date: Jun. 29, 2017

(65) Prior Publication Data
US 2021/0164803 A1  Jun. 3, 2021

(30) Foreign Application Priority Data
Dec. 24, 2015  (NZ) ........................................ 715552

(51) Int. Cl.
*G01C 22/02*  (2006.01)
(52) U.S. Cl.
CPC ................... *G01C 22/02* (2013.01)

(58) Field of Classification Search
CPC ..................................................... G01C 22/02
See application file for complete search history.

(56) References Cited

U.S. PATENT DOCUMENTS

| 3,358,230 A | 12/1967 | Wiley |
| 4,657,289 A | 4/1987 | Boyer |
| 4,697,278 A | 9/1987 | Fleischer |

(Continued)

FOREIGN PATENT DOCUMENTS

| EP | 1619044 | 5/2011 |
| NZ | 533764 A | 12/2006 |

OTHER PUBLICATIONS

Wikipedia, "Time to first fix", URL:https://en.m.wikipedia.org/wiki/Time_to_first_fix.

(Continued)

*Primary Examiner* — Kyle R Quigley
(74) *Attorney, Agent, or Firm* — Leason Ellis LLP

(57) ABSTRACT

An electronic distance recorder configured to be coupled to a wheel hub of a vehicle, the electronic distance recorder comprising: means for determining distance travelled by the vehicle; means for storing a current vehicle odometer value; means for accruing the current vehicle odometer value based on the distance travelled by the vehicle; a receiver for receiving license data representative of a vehicle license issued for the vehicle; and an electronic display configured to display an indication of the validity of the vehicle license. Vehicle information recorders, communication devices and power generators are also disclosed.

19 Claims, 7 Drawing Sheets

(56) References Cited

U.S. PATENT DOCUMENTS

| | | | |
|---|---|---|---|
| 4,989,222 A | | 1/1991 | Lutts et al. |
| 5,505,080 A | * | 4/1996 | McGhee ............... B60C 23/004 |
| | | | 116/34 R |
| 5,585,711 A | | 12/1996 | Kemmer et al. |
| 6,124,810 A | | 9/2000 | Segal et al. |
| 6,742,386 B1 | | 6/2004 | Larson |
| 2004/0083811 A1 | | 5/2004 | Kranz |
| 2007/0210905 A1 | | 9/2007 | Battista |
| 2009/0096599 A1 | | 4/2009 | Krantz |
| 2013/0110345 A1 | * | 5/2013 | Wilson ................... G01C 22/02 |
| | | | 701/31.4 |
| 2016/0076973 A1 | | 3/2016 | White et al. |

OTHER PUBLICATIONS

Anonymous, 'GNSS antennas: RF design considerations for u-blox GNSS receivers', URL:https://www.u-blox.com/sites/default/files/products/documents/GNSS-Antennas_AppNote_%28UBX-15030289%29.pdf.

Wikipedia, "GPS signals", URL:https://en.m.wikipedia.org/wiki/GPS_signals.

* cited by examiner

ELECTRONIC DISTANCE RECORDER

CROSS-REFERENCE TO RELATED PATENT APPLICATIONS

This is a U.S. National Phase Application under 35 U.S.C. § 371 of International Patent Application No. PCT/NZ2016/050205, filed Dec. 23, 2016, and claims priority to New Zealand Application No. 715552 filed Dec. 24, 2015, which is incorporated by reference in its entirety. The International Application was published on Jun. 29, 2017, as International Publication No. WO 2017/111620 A1.

FIELD OF THE INVENTION

The invention relates to apparatus for measuring distance travelled by a vehicle. In some embodiments, the invention relates to an electronic distance recorder for mounting on the wheel hub of a vehicle.

BACKGROUND OF THE INVENTION

It is useful to accurately measure the distance travelled by a vehicle (such as a driven vehicle or a trailer). It is also useful to be able to identify and report on the location of the vehicle at a given time. Accurate distance measurement can be used to maintain a vehicle odometer for the purpose of levying fees according to the distance travelled by the vehicle to contribute to the costs of the road system. Accurate vehicle tracking enables the owner of the vehicle to monitor its use in real time, which is particularly useful for an owner of a fleet of vehicles. In some countries there is a requirement to track information such as the distance travelled by a vehicle and the location of that distance, along with regulatory requirements that it is tracked securely. For example, in New Zealand where road user charges are applied for diesel-powered vehicles according to distance travelled, the New Zealand Transport Agency (NZTA) requires vehicles to track distance travelled accurately and securely.

A conventional solution is to fit a mechanical or electronic hubodometer to a wheel hub of each vehicle that needs to be tracked. The hubodometer accrues and displays an odometer value based on the number of wheel revolutions. However, these conventional hubodometers do not provide any means of tracking the location of a vehicle.

More recently, electronic distance recorders have been developed which use GPS tracking and which are also able to receive a signal indicating wheel rotation. These electronic distance recorders function as both an official odometer for the vehicle, and a vehicle tracker/monitor. However, these existing electronic distance recorders have been less popular in relation to trailers, due to power management difficulties and overly expensive hardware.

OBJECT OF THE INVENTION

It is an object of the invention to provide an improved electronic distance recorder, vehicle information recorder and/or vehicle tracking system.

Alternatively, it is an object of the invention to at least provide the public with a useful choice.

SUMMARY OF THE INVENTION

Embodiments of the present technology are directed towards a device which can be easily installed on either a self-powered vehicle or a trailer, which can track and report on the vehicle's location, as well as maintain an official odometer value for the vehicle.

The term "electronic distance recorder" in this specification is not intended to refer only to devices which meet particular legislative or regulatory requirements to be approved for use as electronic distance recorders in New Zealand or in any country. Unless the context indicates otherwise, "electronic distance recorder" means an electronic device that can measure and/or record distance travelled.

According to a first aspect of the invention, there is provided an electronic distance recorder configured to be coupled to a wheel hub of a vehicle, the electronic distance recorder comprising:
 means for determining distance travelled by the vehicle;
 means for storing a current vehicle odometer value;
 means for accruing the current vehicle odometer value based on the distance travelled by the vehicle;
 a receiver for receiving license data representative of a vehicle license issued for the vehicle; and
 an electronic display configured to display an indication of the validity of the vehicle license.

In one embodiment, the license data comprises a license expiry odometer value at which the vehicle license expires and the electronic display is configured to display the license expiry odometer value and the current vehicle odometer value on the electronic display. A comparison of the license expiry and current odometer values will be understood to provide the indication of validity of the vehicle license, for example if the current odometer value is less than the license expiry odometer value.

Preferably, the electronic distance recorder is configured to display the license data on the electronic display.

Preferably, the license data comprises a registration number of the vehicle.

Preferably, the license data comprises a starting odometer value, and the electronic distance recorder is configured to determine whether the vehicle is compliant with the vehicle license (i.e. the license is valid) based on whether or not the current vehicle odometer value is within the starting and license expiry odometer values.

Preferably, the license data comprises one or more of: a license type number, a license number, an electronic distance recorder ID number, a vehicle maximum gross weight, an issuing location, an electronic system provider identification, a date and time of issue, and a barcode.

Preferably, the electronic distance recorder is configured to detect incorrect operating conditions.

Preferably, electronic display is configured to display an indication of the incorrect operating conditions.

Preferably, the electronic display is configured to display the license data and the vehicle odometer value without power being received by the electronic display.

In some embodiments, the electronic display comprises electronic paper.

Preferably, the electronic distance recorder comprises:
 a memory configured to store the odometer value; and
 at least one processor configured to receive one or more indications of distance travelled by the vehicle, determine the distance travelled by the vehicle, and accrue the odometer value in the memory.

Preferably, the electronic distance recorder comprises a wheel rotation sensing means, and the processor is configured to receive an indication of wheel rotation from the wheel rotation sensing means. Preferably, the wheel rotation sensing means comprises a wheel rotation sensing circuit.

Preferably, the electronic distance recorder comprises a GNSS receiver, and the processor is configured to receive an indication of vehicle position from the GNSS receiver.

The term "GNSS" is to be understood to refer to any satellite navigation system, global or otherwise including all global navigation satellite systems such as GPS, GLONASS, Galileo, and the like.

Preferably, the electronic distance recorder comprises an accelerometer, and the processor is configured to receive an indication of vehicle movement from the accelerometer.

Preferably, the receiver comprises a means for communication with a central server via a wireless communication network, for example a modem.

Preferably, the electronic distance recorder comprises a transmitter configured to transmit the current vehicle odometer value to the central server.

In some embodiments, the vehicle is a self-powering vehicle. In other embodiments the vehicle is a trailer.

According to second aspect of the invention, there is provided a display device for mounting on or in a vehicle, the display device comprising:
  a receiver configured to receive vehicle information; and
  an electronic display configured to display the vehicle information,
  wherein the electronic display is configured to maintain the display of the vehicle information without power being used to maintain the display of the vehicle information.

In some embodiments, the electronic display comprises electronic paper.

Preferably, the display device is configured to receive and display a vehicle odometer value.

In some embodiments, the display device comprises an electronic distance recorder.

Preferably, the electronic distance recorder comprises means for determining distance travelled by the vehicle.

Preferably, the electronic distance recorder comprises means for storing a vehicle odometer value.

Preferably, the electronic distance recorder comprises means for accruing the vehicle odometer value based on the distance travelled by the vehicle.

In some embodiments, the display device is configured to be coupled to a wheel hub of the vehicle. In other embodiments, the display device is configured to be mounted in the cab of the vehicle in a position that allows information on the display device to be read by a person or device external to the vehicle.

Preferably, the display device is configured to receive and display license data corresponding to a vehicle license, and is configured to maintain the display of the license data on the electronic display without power being received by the electronic display.

According to a third aspect of the invention, there is provided a generator comprising:
  a rotor;
  a first rotatable portion configured to be driven to rotate the rotor;
  a second rotatable portion rotatably mounted relative to the first rotatable portion and comprising a stator, the second rotatable portion being biased towards a rest orientation.

In some embodiments, the generator comprises control means configured to control torque applied between the rotor and the stator when the rotor rotates relative to the stator to generate power in the generator, the control means controlling torque to limit rotation of the second rotatable portion from the rest orientation.

Preferably, the rotor is coupled to and driven by the first rotatable portion.

Preferably, the first rotatable portion comprises a casing of the generator and a shaft extending into the interior of the casing.

Preferably, the second rotatable portion comprises a chassis rotatably mounted on the shaft.

Preferably, the rotor is rotatably mounted on the second rotatable portion.

Preferably, the rotor is coupled to the first rotatable portion via a gear assembly. Preferably, the gear assembly is configured to increase angular velocity of the rotor relative to the first rotatable portion.

Preferably, the stator and the rotor rotate, in use, around an axis of rotation oriented perpendicular to an axis of rotation around which the first rotatable portion rotates in use. Preferably, the stator is coupled to a first bevel gear and the rotor is coupled to a second bevel gear, the first and second bevel gears being rotatably engaged with each other.

In an alternative embodiment, the rotor is fixedly coupled to the first rotatable portion.

In some embodiments, the first rotatable portion is configured to be fixedly mounted directly or indirectly to a wheel hub of a vehicle.

Preferably, the generator is configured to control the torque applied between the rotor and the stator by controlling the power generated by the generator.

Preferably, the generator is configured to control the torque applied between the rotor and the stator by controlling current drawn from the generator.

Preferably, the generator is configured to control the torque applied between the rotor and the stator based on an orientation of the second rotatable portion.

Preferably, the generator is oriented with the second rotatable portion configured to rotate around a horizontal axis of rotation, the second rotatable portion comprising a centre of mass and a centre of rotation, and the second rotatable portion being configured such that the centre of mass is offset from the centre of rotation to bias the second rotatable portion towards the rest orientation, the rest orientation being the lowest position of the centre of mass.

Preferably, the generator comprises a sensor configured to provide an indication of the orientation of the second rotatable portion, and the control means is configured to control the torque applied to the second rotatable portion based on the indication of the orientation of the second rotatable portion.

Preferably, the control means is configured to adjust the torque applied between the rotor and the stator to allow the second rotatable portion to rotate towards a selected charging orientation.

In some embodiments, in the selected charging orientation, the second rotatable portion is rotated substantially 90 degrees from the rest orientation.

According to a fourth aspect of the invention, there is provided a vehicle information recorder comprising:
  means for determining a position of, and/or a distance travelled by, a vehicle;
  a battery for powering the vehicle information recorder;
  a generator for generating power for supply to the battery, the generator comprising:
    a rotor;
    a first rotatable portion configured to be fixedly mounted on the wheel hub of the vehicle and configured to turn the rotor upon rotation of the wheel hub;

a second rotatable portion rotatably mounted to the first rotatable portion and comprising a stator, the second rotatable portion having a bias towards a rest orientation.

In some embodiments, the generator comprises control means configured to control torque applied from between the rotor and the stator when the rotor rotates relative to the stator to generate power in the generator, the control means controlling torque to limit rotation of the second rotatable portion from the rest orientation.

Preferably, the vehicle information recorder comprises a generator according to the third aspect of the invention.

Preferably, the vehicle information recorder comprises means for storing a vehicle odometer value.

Preferably, the vehicle information recorder comprises means for accruing the vehicle odometer value based on the distance travelled by the vehicle.

In some embodiments, the vehicle information recorder is configured to transmit the position of, and/or the distance travelled by, the vehicle to a receiver remote from the electronic distance recorder. In some embodiments the vehicle information recorder transmits the position or distance to a central server.

In some embodiments, the vehicle information recorder is configured to receive a vehicle odometer value.

Preferably, the vehicle information recorder comprises one or more antennas fixed with respect to the second rotatable portion and positioned such that, when the second rotatable portion is in a selected charging orientation, the antennas are in a selected communication orientation.

Preferably, the one or more antennas are a GNSS antenna and a cellular antenna.

Preferably, the vehicle information is configured to maintain the display of the vehicle odometer value, without power being received by the electronic display.

Preferably, the electronic display comprises a memory display. In some embodiments the electronic display comprises electronic paper.

According to a fifth aspect of the invention, there is provided a communication device comprising:
  a first rotatable portion configured to be fixedly mounted to the wheel hub of a vehicle;
  a second rotatable portion rotatably mounted on the first rotatable portion;
  biasing means for biasing the second rotatable portion towards a rest orientation; and
  at least one communication antenna mounted to the second rotatable portion,
  wherein during travel of the vehicle when the first rotatable portion is spinning, the biasing means substantially prevents the second rotatable portion from spinning with the first rotatable portion, stabilising the communication antenna.

Preferably, the communication device comprises a vehicle information recorder comprising means for determining a position of and/or a distance travelled by a vehicle.

Preferably, the communication device comprises control means to allow the second rotatable portion to rotate to a selected travel orientation during travel of the vehicle.

Preferably, when the second rotatable portion is in the selected travel orientation, the communication antenna is in a selected communication orientation.

Preferably, the communication device comprises a rotor of a generator configured to be driven by the first rotatable portion, and a stator of the generator provided to the second rotatable portion, the generator configured to provide power for supply to a battery for powering the communication device.

Preferably, the communication device comprises an electronic distance recorder or a vehicle information recorder.

Preferably, the biasing means comprises a mass provided to the second rotatable portion offset from an axis of rotation thereof, the mass acting in use to resist rotation of the second rotation portion from the rest orientation.

According to sixth aspect of the invention, there is provided an electronic distance recorder for determining the distance travelled by a vehicle, the electronic distance recorder comprising:
  a generator configured to generate an output voltage for charging a power storage device;
  means for detecting variations in the output voltage; and
  means for determining a distance travelled by the vehicle based on the variations in the output voltage.

Preferably, the electronic distance recorder comprises the power storage device, for example a battery. More preferably, the power storage device is configured to supply power to the electronic distance recorder.

In some embodiments, the generator generates an AC voltage output. In some embodiments, the electronic distance recorder comprises means for determining the distance travelled based on the frequency of the AC voltage output.

In some embodiments, the generator generates a DC voltage output. In some embodiments, the electronic distance recorder comprises means for determining the distance travelled based on a frequency of cyclic variation in the DC voltage output.

Preferably, the generator comprises a rotor and a stator, the rotor being driven by a wheel hub of the vehicle. In some embodiments the rotor is fixed to the wheel hub.

Preferably, the electronic distance recorder comprises means for storing a vehicle odometer value.

Preferably, the electronic distance recorder comprises means for accruing the vehicle odometer value based on the distance travelled by the vehicle.

Preferably, the electronic distance recorder comprises an electronic display for displaying the odometer value.

According to a seventh aspect of the invention, there is provided a vehicle information recorder configured to be mounted to a wheel hub of a vehicle, the vehicle information recorder comprising:
  a GNSS receiver;
  a processor configured to receive location information from the GNSS receiver and to determine a position of and/or a distance travelled by the vehicle based on the location information.

Preferably, the vehicle information recorder comprises means for storing a vehicle odometer value.

Preferably, the vehicle information recorder comprises means for accruing the vehicle odometer value based on the distance travelled by the vehicle.

Preferably, the vehicle information recorder comprises means for transmitting the position of and/or the distance travelled by the vehicle to a receiver remote from the vehicle information recorder.

Preferably, the vehicle information recorder comprises an electronic display configured to display the vehicle odometer value.

According to an eighth aspect of the invention, there is provided a vehicle information recorder configured to be mounted to a wheel hub of a vehicle, the vehicle information recorder comprising:

means for determining a position of and/or a distance travelled by the vehicle;

means for actively transmitting the position of and/or the distance travelled by the vehicle to a receiver.

It should be understood that the term "active transmission" is not intended to refer to transmission from passive or semi-passive RFID hardware.

Preferably, the vehicle information recorder is configured to transmit the position of and/or the distance travelled over a wireless network to a server.

Preferably, the means for transmitting the position of and/or the distance travelled by the vehicle is cellular modem.

According to ninth aspect of the invention, there is provided a vehicle tracking system comprising:

at least one electronic distance recorder and/or vehicle information recorder, as the case may be, according to any one of the first, fourth, sixth, seventh or eighth embodiments of the invention; and at least one server;

wherein the electronic distance recorder and/or vehicle information recorder, as the case may be, is configured to communicate with the server.

In some embodiments, the electronic distance recorder and/or vehicle information recorder, as the case may be, is configured to transmit a vehicle odometer value to the server, and the server is configured to transmit license data to the electronic distance recorder.

In some embodiments, the server is configured to transmit the license data in the form of instructions to display the license data in a predetermined format.

In some embodiments, the server is configured to transmit the license data in a form representative of an image of a label.

In other embodiments, the server is configured to transmit the license data in the form of a print file.

Further aspects of the invention, which should be considered in all its novel aspects, will become apparent to those skilled in the art upon reading of the following description which provides at least one example of a practical application of the invention.

DETAILED DESCRIPTION OF PREFERRED EMBODIMENTS OF THE INVENTION

Figure 1:
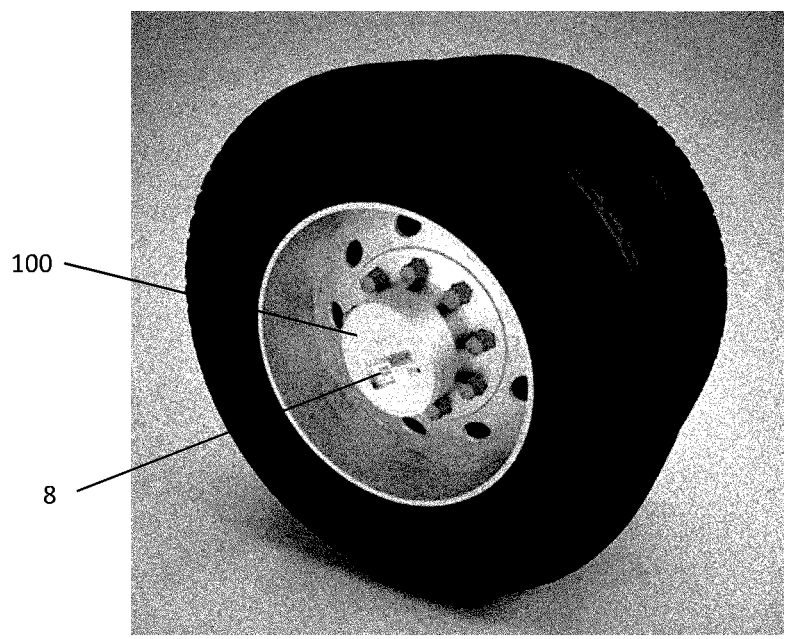
FIG. 1 is a perspective view illustration of an electronic distance recorder according to a preferred embodiment of the invention.

FIG. 1 shows an electronic distance recorder (EDR) 100 according to a preferred embodiment of the invention, when installed on a wheel hub of a vehicle.

The EDR 100 comprises means for mounting the EDR to a wheel hub. The device may be mounted to the wheel hub in any suitable manner, such as will be apparent to a skilled addressee. The particular way in which an EDR is mounted to a wheel hub or wheel may differ between various embodiments of the present invention. For example, in one embodiment the EDR is configured to be fixed to a bracket which is fixed to the wheel hub. In another embodiment the EDR may be configured to couple directly to a hub cap. The EDR may comprise a mounting portion configured to connect to a mounting bracket or hub cap. The mounting portion may be in the form of a threaded stud configured to be secured to a bracket or hubcap with a nut. In some embodiments the EDR may comprise a hub cap portion configured to be coupled to a wheel hub and function as a hub cap. The EDR may be integral to a hub cap.

The EDR 100 comprises an electronic display 8 which displays information such as a vehicle odometer value and vehicle license data. In this embodiment the EDR 100 displays an image of a label which displays the license data.

Some devices according to embodiments of the invention may not determine distance travelled by the vehicle and may instead or additionally determine the vehicle's position or other information. In such embodiments, the device may be considered a vehicle information recorder rather than an electronic distance recorder. An electronic distance recorder according an embodiment of the invention may also be considered a vehicle information recorder. In some embodiments the device may calculate distance travelled by a vehicle, but for informational purposes rather than for the purpose of accruing an official odometer value for the vehicle.

Vehicle Tracking System

Figure 2:
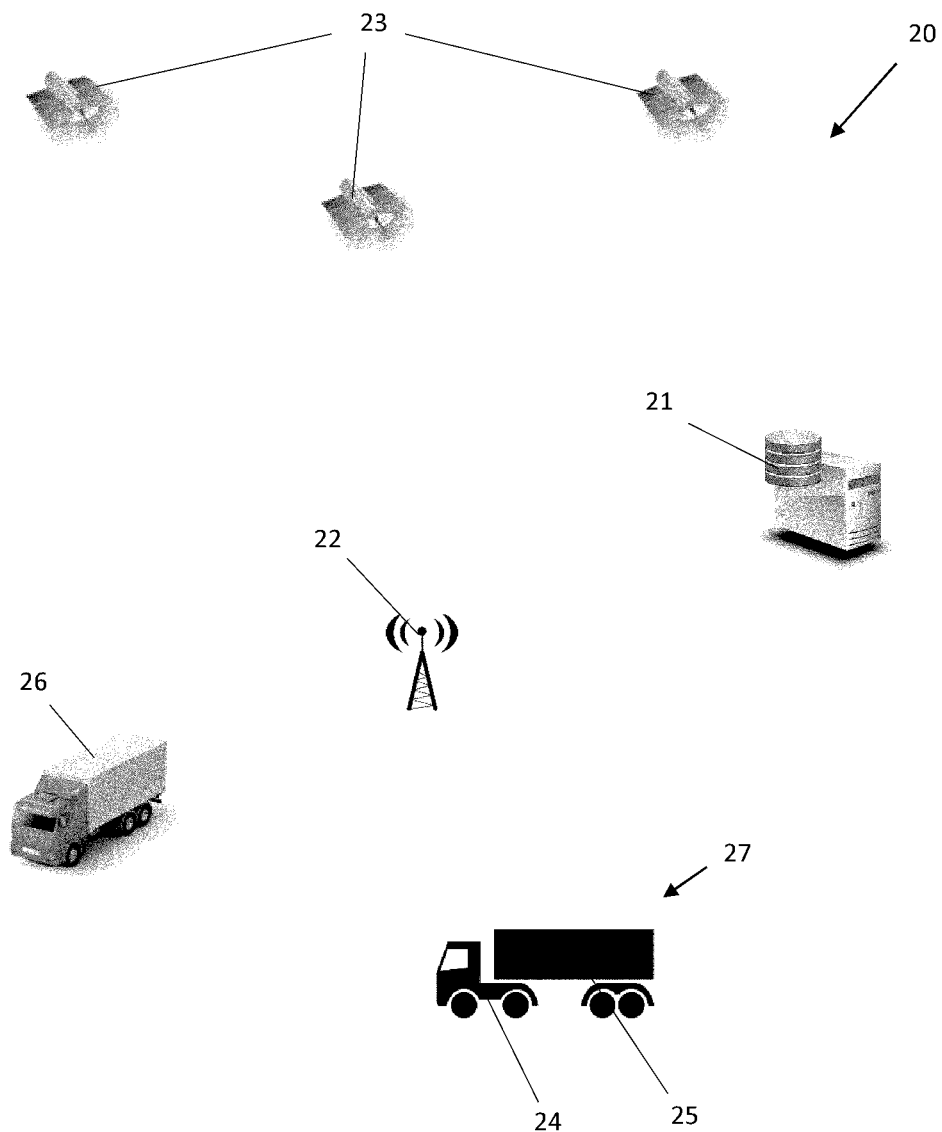
FIG. 2 is a schematic system diagram of a vehicle tracking system including the electronic distance recorder of FIG. 1.

FIG. 2 shows a schematic diagram of a vehicle tracking system 20 according to an embodiment of the invention which is enabled by the use of EDRs such as the EDR 100 shown in FIG. 1 or an EDR 1 which is described below with reference to FIGS. 3 and 4.

The vehicle tracking system 20 comprises a central server 21 configured to communicate with electronic distance recorders over a wireless communication network, for example a mobile network via cell tower 22. Two vehicles 26 and 27 are shown in FIG. 2. Vehicle 26 is a truck with no trailer, and is equipped with an EDR according to an embodiment of the invention. Vehicle 27 is a truck 24 towing a trailer 25. Each of the truck 24 and trailer 25 may be considered separate vehicles for tracking purposes, since the trailer 25 can be disconnected from the truck 24. Additionally, in some jurisdictions, there is a regulatory requirement to track trailers independently. For example, in New Zealand it is required to pay road user charges based on the distance travelled by a trailer separately to the road user charges payable for driven vehicles. Therefore, each of the truck 24 and trailer 25 is equipped with an EDR 1 according to an embodiment of the invention. Each EDR comprises a GPS receiver which receives a signal from GPS satellites 23. In other embodiments the EDR may comprise an alternative satellite receiver such as any suitable GNSS receiver.

Electronic Distance Recorder/Vehicle Information Recorder

Figure 3:
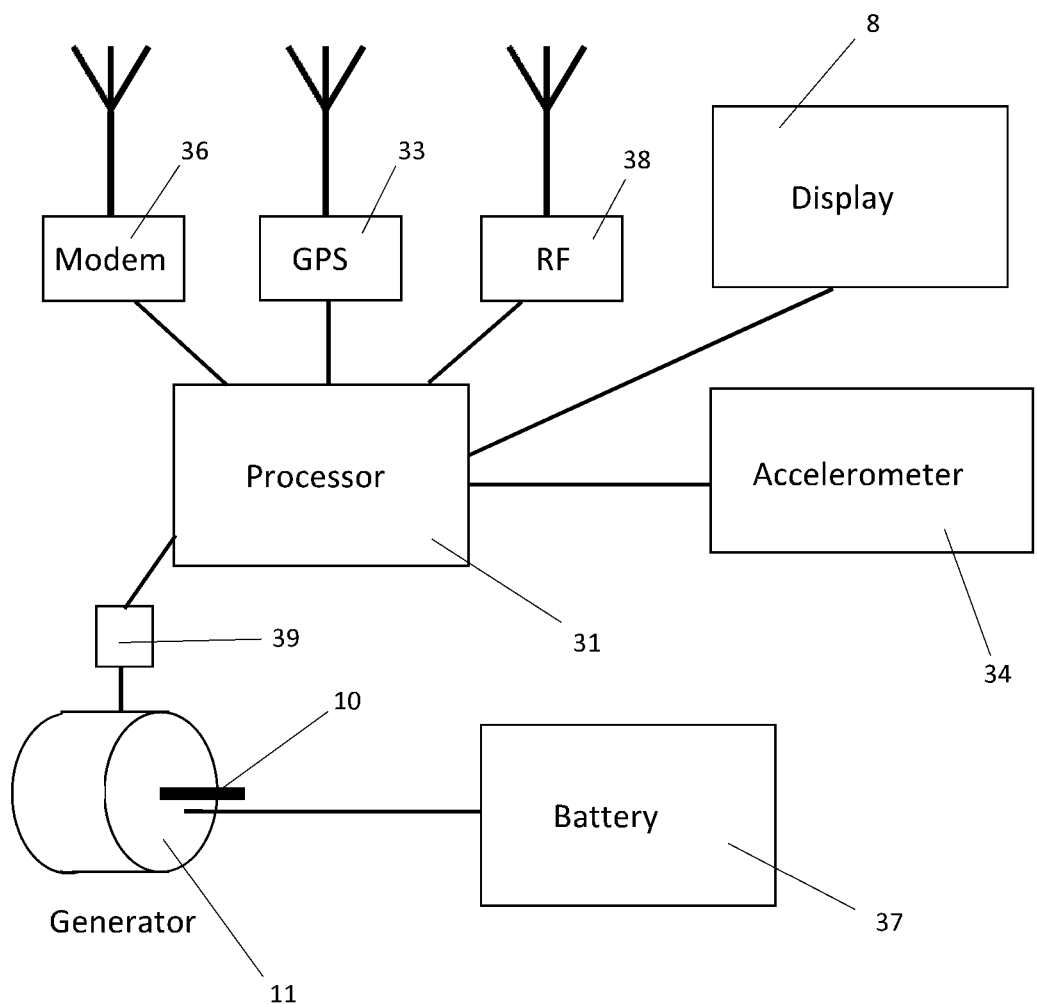
FIG. 3 is a block diagram showing components of the electronic distance recorder of FIG. 1.
Figure 4:
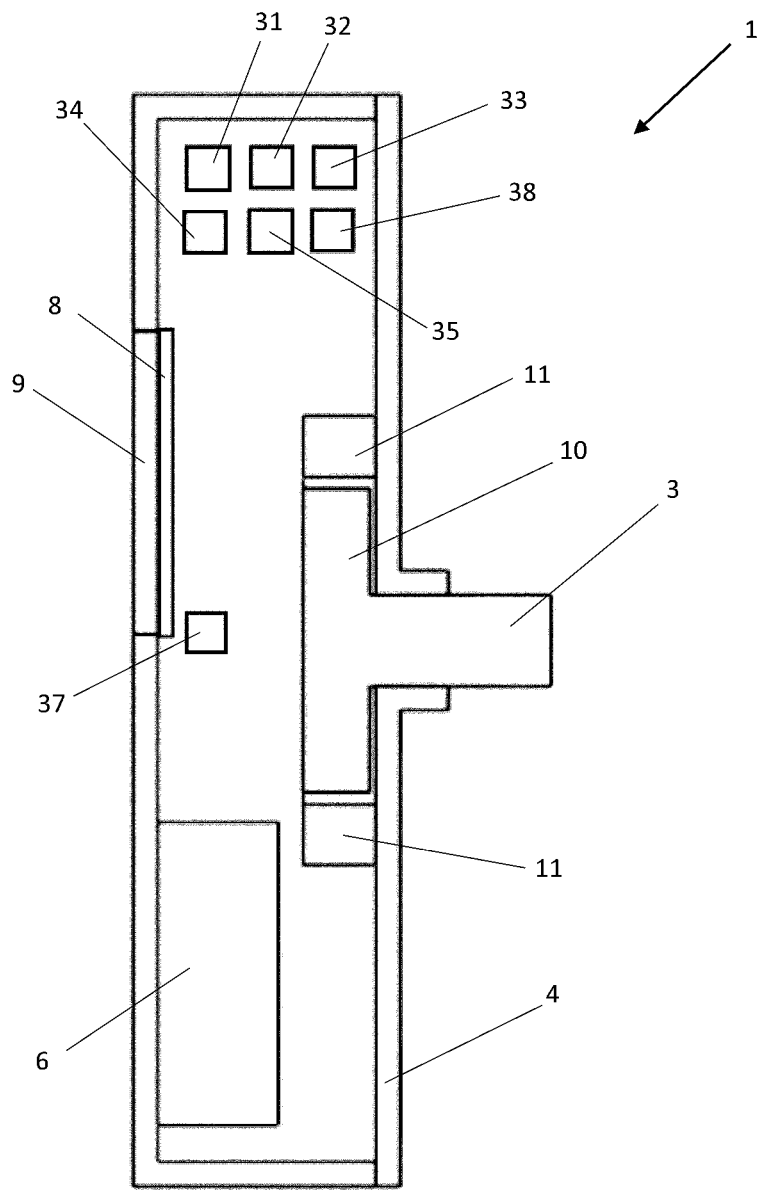
FIG. 4 is a cross section schematic illustration of the electronic distance recorder of FIG. 1.

FIG. 3 shows a block diagram of some components in an electronic distance recorder (EDR) 1, and FIG. 4 is shows a schematic illustration of the cross section of the EDR 1, which will be described in relation to its use as part of the vehicle tracking system 20 where relevant. The EDR 1 comprises a mounting shaft 3 for mounting the EDR 1 to a wheel hub on a vehicle in any suitable manner, which may differ between embodiments depending on the particular wheel hub to which the EDR 1 is to be mounted. For some wheel hubs, a mounting bracket may be used. Supported on the mounting shaft 3 is a casing 4. The casing 4 is supported on bearings (not shown), enabling the casing 4 to rotate in use relative to a mounting shaft 3, which defines a rotation axis. In some embodiments the EDR may comprise a further protective casing fixedly connected to the mounting shaft 3 to protect the casing 4, the protective casing including a window so that the casing 4 is visible to a person alongside the vehicle inspecting the EDR, such as the driver or an inspector.

Inside the casing 4 is an offset mass 6 which is mounted to or held by the casing 4 to bias the casing 4 towards an orientation in which the offset mass 6 is at its lowest possible position when the EDR 1 is installed on a wheel hub. The offset mass 6 is considered "offset" because it is not axially centred within the EDR 1, as described in more detail below. This orientation of the casing 4 with the offset mass at the low position as shown in FIG. 4 may be considered a rest orientation. The offset mass 6 has a mass that is sufficiently large in comparison to the mass of other components housed in the EDR 1 so that the casing 4 has a centre of gravity offset from its axis of rotation. When disturbed from the rest orientation the weight of the offset centre of gravity urges the casing 4 to rotate on the mounting shaft 3 back towards the rest orientation. When the vehicle is being driven and the mounting shaft 3 is turning, the moment produced by the offset centre of gravity counteracts the frictional forces between the bearings (not shown) and the mounting shaft 3 and casing 4, and any other forces which may tend to urge the casing 4 to rotate with the mounting shaft 3.

In alternative embodiments (described in more detail below) an outer casing may be fixedly mounted to a wheel hub of a vehicle, with a stationary portion rotatably mounted inside the outer casing. The stationary portion may have an offset mass fixed to it to bias it into a rest orientation, preventing it from spinning with the outer casing while the vehicle is driven. The stationary portion may have an electronic display mounted thereon, and the outer casing may have a window through which the electronic display is visible to a person alongside the vehicle, in order to display a current odometer value along with a license label or data. All electronics may be conveniently fixed on the stationary portion to avoid the need for an electrical connection between the rotating outer casing and the stationary inner casing. Any antennas may be mounted to the stationary inner portion so that they do not spin as the vehicle travels.

It is to be understood that, while one portion of an EDR according to an embodiment of the invention may be referred to as "rotating" while another portion of the EDR is referred to as "stationary", the stationary portion of the EDR is able to rotate on an axis and may in use rock clockwise and anticlockwise about its axis. However, the stationary portion of the EDR is named "stationary" because it does not rotate with the wheel of the vehicle as the vehicle travels.

In the embodiment of FIG. 4, also mounted to the casing 4, for example on the opposite side to the offset mass 6 or on either side of the mounting shaft 3, are electronic components of the EDR 1 including, without limitation, a processor 31, memory 32, GPS receiver and antenna 33, accelerometer 34, wireless transmitter and wireless receiver (e.g. cellular modem) 36, battery 37, RF module 38, and electronic display 8. Electrical connections between these electronic components are not explicitly shown in FIG. 4 but will be apparent to the skilled addressee upon reading the following description. The electronic display 8 is mounted so that the electronic display 8 is visible through a window 9 in the casing 4. In other embodiments of the invention the particular electronic components that are included may vary, and they may be located in different positions to those shown schematically in FIG. 4.

Together, the electronics of the EDR 1 provide means for determining distance travelled by the vehicle, means for storing a vehicle odometer value and means for accruing a vehicle odometer value based on the distance travelled by vehicle. The EDR 1 comprises a wheel rotation sensing means, which may be any means for sensing rotation of the mounting shaft 3, or a component connected thereto, relative to the casing 4. In this embodiment, the wheel rotation sensing means is a wheel rotation sensing circuit 39 configured to provide a signal to the processor 31 indicative of the rotational speed of the mounting shaft 3 relative to the casing 4. The signal may be in the form of a pulsing electrical signal from which a number of wheel rotations in a given time interval can be inferred. The processor 31 is configured to determine distance travelled by the vehicle based on the signal from the wheel rotation sensing means, using a suitable method. The processor 31 updates the vehicle odometer value stored in the memory 32 of the EDR 1, enabling the EDR 1 to function as an odometer for the vehicle on which it is installed. The processor 31 also controls the electronic display 8 in order to display the vehicle odometer value.

The GPS receiver 33 in the EDR 1 may track the location of the vehicle, and may also provide an indication of distance travelled for the processor 31 to enable to the processor 31 to accrue the vehicle odometer value. In this embodiment the processor 31 is configured to calculate distance travelled by the vehicle based on position data generated by the GPS receiver 33. In other embodiments the GPS receiver may calculate distance travelled. In further embodiments the EDR 1 may transmit position data collected by the GPS receiver 33 to the central server 21, and the central server 21 may calculate distance travelled by the vehicle.

The accelerometer 34 in the EDR 1 may determine if the vehicle is moving and may provide an indication of distance travelled to the processor 31, which then calculates the distance travelled. For example, the processor 31 may be configured to integrate the output of the accelerometer 34 to determine the speed of the vehicle, from which distance travelled can be calculated. Additionally, the output of the accelerometer 34 may be used by the EDR 1 to detect movement while the EDR 1 is in a low power state. If the accelerometer 34 detects movement, the EDR 1 may be configured to wake up from the low power state and begin using the GPS receiver 33 to track the movement of the vehicle.

The cellular modem 36 in the EDR 1 communicates with a central server to provide information for tracking purposes and for licensing purposes (described below). With reference to the vehicle tracking system 20, the EDR 1 in each of the truck 24, trailer 25 and vehicle 26 sends the vehicle odometer value determined by the EDR 1, along with other collected information such as GPS position/distance information calculated based on GPS signals received from the GPS satellites 23, to the central server 21 via cell tower 22. This information may be sent to the central server with data identifying the EDR to which the information relates so that central server can track the distance information separately for each vehicle.

In this preferred embodiment the RF module 38 is a 433 MHz interface or an RF module operating in the frequency range of approximately 400-450 MHz. The use of a 433 MHz interface may advantageously be less susceptible than RF communication devices operating at other frequencies to being blocked or attenuated by the body and chassis of the vehicle/trailer. In other embodiments a Bluetooth module, NFC module or other RF interface may be incorporated in the EDR. The RF module 38, or other RF interface in other embodiments, allows the EDR 1 to communicate with other hardware. The EDR 1 may be configured to send the vehicle odometer value to other devices. For example, the EDR 1 may be configured to send the vehicle odometer value and license data via an RF link or Bluetooth to an in-cab device which is configured to display the vehicle odometer value and license data to the driver in real time, or by NFC to device in proximity of the EDR. This enables the driver to know, in some embodiments while driving, whether or not the vehicle is compliant. This information may also be sent to other devices via other wireless communication protocols or via wired communication means.

In some embodiments there is provided an EDR configured to be mounted to a wheel hub of a vehicle, having only some of the components of the EDR 1 described above. Such an EDR may comprise a GNSS receiver, and a processor configured to receive information, such as position or location information, from the GNSS receiver and calculate distance travelled by the vehicle based on the position or location information. The EDR may also comprise means for storing a vehicle odometer value and accruing the vehicle odometer value based on the distance travelled by the vehicle. The EDR may also comprise an electronic display for displaying the vehicle odometer value.

In some embodiments there is provided an EDR configured to be mounted to the wheel hub of a vehicle, and comprising any suitable means for determining a position of or a distance travelled by the vehicle (such as a GPS receiver or wheel rotation sensor), and means for actively transmitting the distance travelled by the vehicle to a receiver. Active transmission should be understood not to include transmission from passive or semi-passive RFID hardware. The active transmission may be over a wireless network (such as a cellular or satellite network) to a server. The means to transmit the distance may be a cellular modem.

Licensing and Information Display

The modem in the EDR 1 is configured to function as a receiver to receive information from the central server 21. The central server 21 transmits license data representative of a vehicle license issued for the vehicle to the modem in the EDR 1, from time to time. Preferably the central server 21 keeps a record of vehicle licences for the vehicles on which an EDR 1 is installed and purchases/revokes licences as required, however in some embodiments the EDR 1 may be configured to send a request to the central server 21 for a new vehicle license, for example if the EDR determines that a new license is required. For example, the processor may compare actual odometer readings for a vehicle with a license expiry odometer value and request the purchase of a new license if the actual odometer value is greater than the license expiry value. Alternatively, the processor may be configured to request the purchase of a new license if the actual value is within a predetermined amount of the expiry value to obtain a new license before the old license can expire.

The EDR 1 is configured to display on the electronic display 8 an indication of the validity of the vehicle license. In this embodiment, the EDR 1 is configured to display a current vehicle odometer value, as well as some or all of the license data, on the electronic display 8 in addition to the current vehicle odometer value. In some embodiments the EDR 1 may display a license expiry odometer value at which the vehicle license expires, along with the current vehicle odometer value. A comparison of the license expiry and current odometer values provides an indication of validity of the vehicle license. Additionally, the EDR 1 displays a starting odometer value from which the vehicle is compliant. This enables the vehicle's owner, or an inspector, to easily determine whether or not the vehicle is compliant with the vehicle license by checking whether or not the vehicle odometer value is between the starting and finishing odometer license values. In this embodiment, the EDR 1 is also configured to display the registration number of the vehicle on the electronic display 8 for verification that the license data shown is for the correct vehicle. In other embodiments, another indication of validity of the license may be shown, for example a tick (if the license is valid) or cross (if it is not), a barcode or QR code encoded with information relating to the validity of the license or another visual representation of the license validity.

Other information which may be included in the license data, and may be displayed on the electronic screen 8 is:
  License type number;
  License number;
  Hubodometer number (such as a unique ID for the EDR);
  Vehicle maximum gross weight;
  Issuing location or electronic system provider identification;
  Date and time of issue; and/or
  A computer readable code, for example a barcode or QR code.

The central server 21 may send different types of license data, for example primary or additional license data. In an embodiment, primary license data may relate to a license that is the usual license for the vehicle, and additional or temporary license data may relate to a license that temporarily supersedes the primary license, such as to allow extra weight to be carried for a particular trip.

The modem in the EDR 1 may receive license data from the central server 21 corresponding to multiple licenses, such as future licenses, and the processor is configured to store the future license data in the memory of the device until it becomes valid. The processor 31 may store the current, future and the most recently expired license data in the memory 32 of the EDR 1, and is configured to delete older expired license data and may delete current license data if instructed to do so by the central server 21, for example in the event the license is revoked. The most recent expired license data is retained in the memory 32 so that if a current license is revoked, the processor 31 can delete the current license data and display the most recent expired license data on the electronic display 8.

Preferably, the display of license data is prioritised to display one type of license data ahead of another type of license data. For example, the processor 31 may be configured to display additional license data on the electronic display 8, but if there is no additional license data in the memory 32, the current primary license data is displayed.

Similarly, if there is no current primary license data in the memory 32, the processor 31 may display the most recent expired primary license data. It will be understood that the processor 31 may be programmed to execute algorithms to execute such rules.

In some embodiments, the central server sends image and/or alphanumeric data representative of a license label to the EDR, which displays the represented image and/or alphanumeric information on the electronic display. In other embodiments, the central server sends a print file, as would be sent to a label printer, to the EDR for the processor to interpret and display on the electronic display. The use of a print file is advantageous in that the EDR can receive license data in the same format as may be in use in an existing license scheme in which the vehicle is required to display a printed label. In other embodiments the license data is sent in any other suitable form, and may be binary data. Additionally, the central server may send any suitable instructions to the EDR to enable the desired information to be displayed.

In preferred embodiments the processor 31 of the EDR 1 also displays any indications that the EDR 1 is not in a regular operational state, is operating incorrectly, or that the vehicle is not compliant with a vehicle license. The indication may be a coloured light on the casing 4, or may be a visual indication on the electronic display 8. These indications may enable the owner or an inspector to determine that one or more components are not functioning correctly or that the EDR has been tampered with. The EDR may be configured to detect an incorrect operating condition and provide an indication accordingly. For example, an incorrect operating condition could be absence of power to one or more components, lower battery charge, detected tampering, failure of one or more components, removed antenna, detected physical damage.

Electronic Display

In some embodiments, advantageously, the EDR 1 is configured to display information with or without power being provided to the electronic display 8. This is achieved by the use of a means to display information which requires power only when the displayed information is changed. This is advantageous as the electronic display 8 does not require a constant power source to display information, allowing the EDR 1 to display the vehicle odometer value to be displayed indefinitely even if no power is provided to the electronic display 8. This is particularly advantageous as it allows the EDR to continually display the information even if the vehicle is inactive for a long period of time and enables compliance with certain regulatory requirements that may exist, for example requiring the display of up-to-date vehicle licensing information on the vehicle at all times, while providing the benefits of displaying information on an electronic device.

In preferred embodiments, the electronic display 8 comprises electronic paper or some other form of low energy display. Any suitable type of electronic paper or low energy display may be used, although in this exemplary embodiment, the electronic display 8 is an electrophoretic display, such as an E Ink display. In other embodiments any suitable type of electronic paper may be used for the electronic display. Electronic paper displays are able to be read under a wide range of lighting conditions and therefore the vehicle odometer value and license information displayed on display 8 can be easily read in many conditions. For example, the electronic paper can be easily read with a torch in the dark, and can also be easily read in direct sunlight. Other electronic displays may become difficult to read in direct sunlight. The electronic paper 8 display can be read both visually by the driver/and inspector human, and machine read such as by a scanning device for reading a barcode or QR code.

In other embodiments, alternative electronic displays that are configured to display information with or without power being provided to the electronic display, may be used in the EDR. Furthermore, in some embodiments the electronic display may require a constant power source to display information. Preferably a display with a low power requirement is employed, such as an LCD display. In some embodiments the electronic display comprises a memory display.

In further embodiments on the invention, there is provided a display device for mounting on or in a vehicle, comprising means to receive data representative of information to be displayed, and an electronic display configured to display the information with or without power being received by the electronic display. In some embodiments of the invention, the display device may not include distance recording functionality. Instead the display device may be configured to receive and display useful information about the vehicle, such as a vehicle odometer value and license data. In some embodiments a display device may be configured to be mounted in the cab of a vehicle in a position that allows information on the display device to be read by a person or device external to the vehicle. Display devices according to embodiments of the invention may display information other than a vehicle odometer value or license data on or in a vehicle for long periods without power supply.

Power Generation

In preferred embodiments the EDR 1 does not require an external power source. EDR 1 is able to generate its own power, and store generated energy in a battery 37 that may be housed within the casing 4. The electronic components in the EDR 1 draw power from the battery as required. In the case of EDR 1, the mounting shaft 3 includes a rotor 10, and a stator 11 is fixedly provided to the casing 4, which together are the rotor and stator of a generator for generating power for the EDR 1 when the vehicle is moving and mounting shaft 3 rotates relative to the casing 4. It should be understood that in other embodiments of the invention, a rotor may be fixedly provided to a casing that is configured to be fixed to a wheel hub and the stator may be rotatably mounted within the casing.

More generally, integral with the EDR 1 is a generator comprising a first rotatable portion (in this embodiment the mounting shaft 3) configured to be driven to rotate a rotor 10 of the generator. Additionally, the generator comprises a second rotatable portion (in this embodiment the casing 4) rotatably mounted to the first rotatable portion. The second rotatable portion comprises a stator 11. In the EDR 1, the stator 11 is fixedly connected directly and indirectly to other components such as the casing 4 and the offset mass 6. Additionally, the rotor 10 forms part of or is fixedly connected to the mounting shaft 3 which is configured to be driven by virtue of being fixedly connected to a wheel hub of a vehicle. The mounting shaft can be considered to be a drive shaft.

In this embodiment, the stator 11 is free to rotate with respect to the surroundings (e.g. other parts of the vehicle), independently of the rotation of the rotor 10. The stator 11 is supported on the rotor 10 by bearings (not shown) allowing for low friction rotation, which enables the rotor 10 to rotate relative to the stator 11. The second rotatable portion of the generator (e.g. the casing 4 in this embodiment) has a bias towards a rest orientation. In this embodiment, as the stator 11 is mounted to the casing 4, the stator 11 is biased towards a rest orientation by virtue of offset mass 6 to prevent the stator 11 spinning with the rotor 10. It should be understood that FIG. 4 is a schematic illustration only and the arrangement of the generator in practice may differ. For example, the stator may be provided around the inside periphery of the casing to maximise the speed with which the magnets/conductors of the rotor pass by the stator conductors/magnets. This may enable higher and/or more efficient power generation and efficient use of space.

In the EDR 1, the armature of the generator is provided by the stator 11, and the magnetic field is provided by one or more magnets mounted on the rotor 10. In other embodiments the rotor may provide the armature. Providing the armature on the stator may provide for convenience in wiring, when the stator and associated electrical components such as conductive wiring provided to the armature and a battery to be charged are all mounted to the same casing.

When the rotor 10 turns relative to the stator 11, the rotor 10 performs work by applying a torque against resistance provided by the stator due to the interaction between the magnetic field and the wiring, which causes power to be generated in the form of current in the wiring. The torque applied from the rotor 10 to the stator 11 urges the stator to turn with the rotor. However, the stator 11 is biased towards a rest orientation by the weight of the offset mass 6, which allows the rotor 10 to rotate relative to the stator and for power to be generated.

Figure 5A:
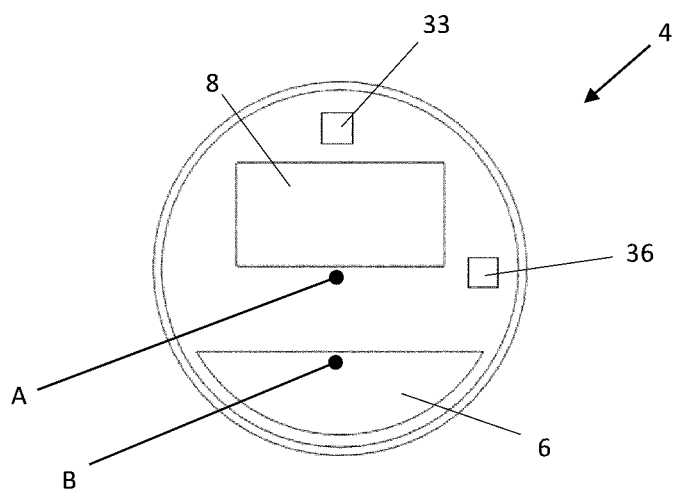
FIG. 5a is a schematic illustration of the electronic distance recorder of FIG. 1, with the stator in a rest orientation.
Figure 5B:
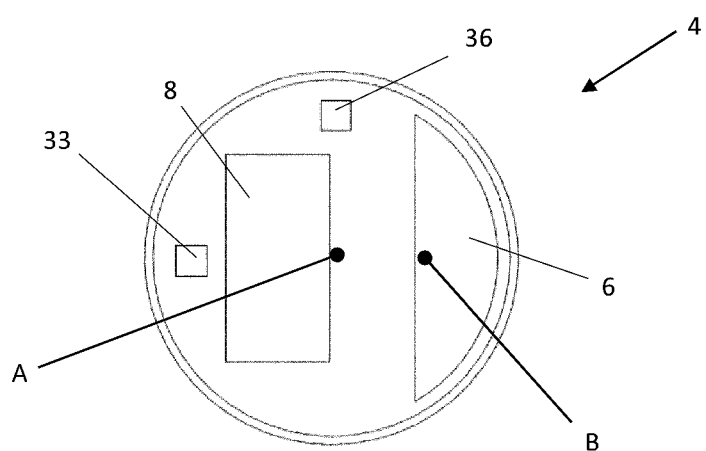
FIG. 5b is a schematic illustration of the electronic distance recorder of FIG. 1, with the stator in an optimal charging orientation.

FIGS. 5a and 5b are schematic views showing the location of offset mass 6 on the casing 4 in the rest orientation and rotated 90 degrees, respectively. The stator 11 is also fixedly mounted to the casing 4, but is not shown in FIGS. 4a and 4b. As described above, the offset mass 6 mounted to the casing 4 causes the combination of the stator 11, casing 4, offset mass 6, and all other components mounted to the casing 4, to have a combined centre of mass that is offset from the centre of rotation.

In FIGS. 4a and 4b, the centre of rotation of the casing 4 (and therefore the stator 11) is indicated by A, and the centre of mass of the combination of components mounted to the casing 4 is indicated by B. In FIG. 4a, the casing 4, and therefore the stator 11, are in the rest orientation as the centre of mass B is at its lowest point. In FIG. 4b, the casing 4, and therefore the stator 11, is rotated 90 degrees from the rest orientation. In this rotated orientation, the centre of mass B is spaced horizontally from the centre of rotation A, which creates a torque due to the force of gravity acting at the centre of mass B at a distance from the centre of rotation A, urging the casing 4 (and stator 11) in the angular direction of the rest orientation shown in FIG. 4a.

When power is generated and a resulting torque is applied from the rotor 10 to the stator 11, the stator 11 rotates with the casing 4 towards the orientation shown in FIG. 4b. If the amount of power being generated is not excessive, and therefore the amount of torque applied to the stator 11 by the rotor 10 is not large enough to overcome the torque that is applied to the stator 11 by the offset centre of mass B, then the stator 11 and casing 4 will reach an equilibrium in which the torque from power generation is equal to the torque provided by the offset centre of mass B. In this equilibrium, the stator 11 is substantially stationary, and power is generated by the rotation of the rotor 10 relative to the stator 11.

If the torque applied to the stator 11 as a result of power generation is larger than the torque that is applied by the offset centre of mass B, the stator 11 will rotate further than 90 degrees from the rest orientation. Since the horizontal spacing between the centre of mass B and the centre of rotation A decreases as the stator 11 and casing 4 rotate more than 90 degrees from the rest orientation, the torque that is applied to the stator 11 by the weight of the offset centre of mass B is also reduced, and the stator 11 and casing 4 will rotate a full 360 degrees in the same direction as the mounting shaft 3. If the stator 11 and casing 4 have rotated 360 degrees, they may have enough momentum to spin for some time, leading to inefficient power generation due to a reduced relative rotational speed between the rotor and stator.

As described above, the offset centre of mass B of the casing 4 provides the most bias on the casing 4 and stator 11 towards the rest orientation of the stator 11 when the casing 4 and stator 11 are rotated 90 degrees from the rest orientation. This sets a limit on the maximum torque resulting from power generation that is acceptable to be applied to the stator 11 and casing 4, to avoid causing the casing 4 and stator 11 to rotate further than 90 degrees and begin to spin. In turn, this sets a limit on the maximum allowable power that can be generated.

The generator therefore produces the maximum allowable power when the stator 11 and casing 4 are rotated 90 degrees from the rest orientation. The orientation shown in FIG. 4b can therefore be considered a theoretically optimal charging orientation of the stator 11 and casing 4, because the maximum allowable power is being generated.

The power able to be generated, and therefore the torque applied from the rotor 10 to the stator 11, is dependent on the speed of the rotor 10 relative to the stator 11. The EDR 1 advantageously comprises control means to control the torque applied from the rotor 10 to the stator 11 to limit rotation of the stator 11 away from the rest orientation. Additionally, the control means is configured to adjust the torque applied to the stator 11 to allow the stator 11 to move towards a selected charging orientation, and remain substantially in the selected charging orientation throughout a range of speeds of the rotor 10 (and therefore at a range of vehicle speeds) with the aim of increasing power generation. The processor 31 of the EDR 1 electronically limits the power generated by the generator, in order to limit the torque applied to the stator 11 and casing 4.

For example, the processor 31 limits the power generated so that the torque applied to the stator 11 and casing 4 is as large as, or slightly less than, the counteracting torque that is provided by the offset centre of mass B in the optimal charging orientation. The amount of limitation imposed by the processor 31 is varied depending on the speed of the mounting shaft 3. That is, the processor provides a greater limitation to the generator when the mounting shaft 3 is rotating at high speed, in comparison to low speed. This enables the casing 4 to be maintained at or near the optimal charging orientation, allowing the generator to produce the maximum amount of battery charging power, within the limits of the EDR's design, over a range of vehicle speeds.

It should be noted that the selected charging orientation may in practice be selected to be an orientation of less than 90 degrees, to allow the stator 11 and casing 4 to tolerate minor variations in orientation (such as may result from bumps in the road) without exceeding 90 degrees of rotation from the rest orientation.

The limitation on the torque applied to the stator 11 may be provided by any suitable means. For example, the processor 31 in the EDR 1 is configured to control the current drawn from the generator. It will be understood that in various embodiments, the processor that is configured to control power generation may be the same processor which performs other tasks such as distance calculation, or may be a processor dedicated to controlling current drawn from the generator, such as a processor in a dedicated controller for the generator. When the rotor 10 is rotating at a higher speed, the generator provides a larger potential difference at its output in comparison to a slower speed. By limiting the current drawn from the output of the generator when the rotor 10 rotates at a high speed, the processor 31 limits the power generated and therefore the torque applied to the stator 11.

The processor may limit the current drawn from the generator by any suitable means, such as by configuring the battery charging circuitry to electronically control the amount of current used to charge the battery, which will control the load on the generator, thereby adjusting the torque provided to the stator.

The EDR 1 comprises a sensor configured to provide an indication of the orientation of the stator, and the processor 31 is configured to receive the indication. The EDR may use any suitable means to determine the orientation of the stator 11 and casing 4 so that the torque on the stator 11 from the rotor 10 can be limited accordingly. For example, the angle of the casing 4 may be measured with an accelerometer mounted on the casing 4. An output signal generated by the accelerometer indicative of the angle of the stator 11 and casing 4 may be provided to the processor.

The EDR may generate either DC or AC power in different embodiments of the invention. The generator in EDR 1 is configured to produce an AC power output, which is rectified and smoothed by an appropriate circuit, and then provided as DC to the battery. In alternative embodiments the EDR may comprise a generator which produces a DC output.

Some embodiments of the invention provide a device for generating power based on the principles described above but not in an EDR. In one embodiment, the power generation device provides power to an EDR that is housed separately and may, for example be mounted in a part of a vehicle remote from the wheel hub, for example in an in-cab EDR unit. Alternatively, the power generation device provides power to another type of device. It will be understood that in such an embodiment the power generation device comprises those components described in relation to the embodiment above that are required for the generation of power but may not include other components, for example those relating to the recordal and monitoring of distance.

Further Embodiments of Hub-Mounted EDRs

Figure 6:
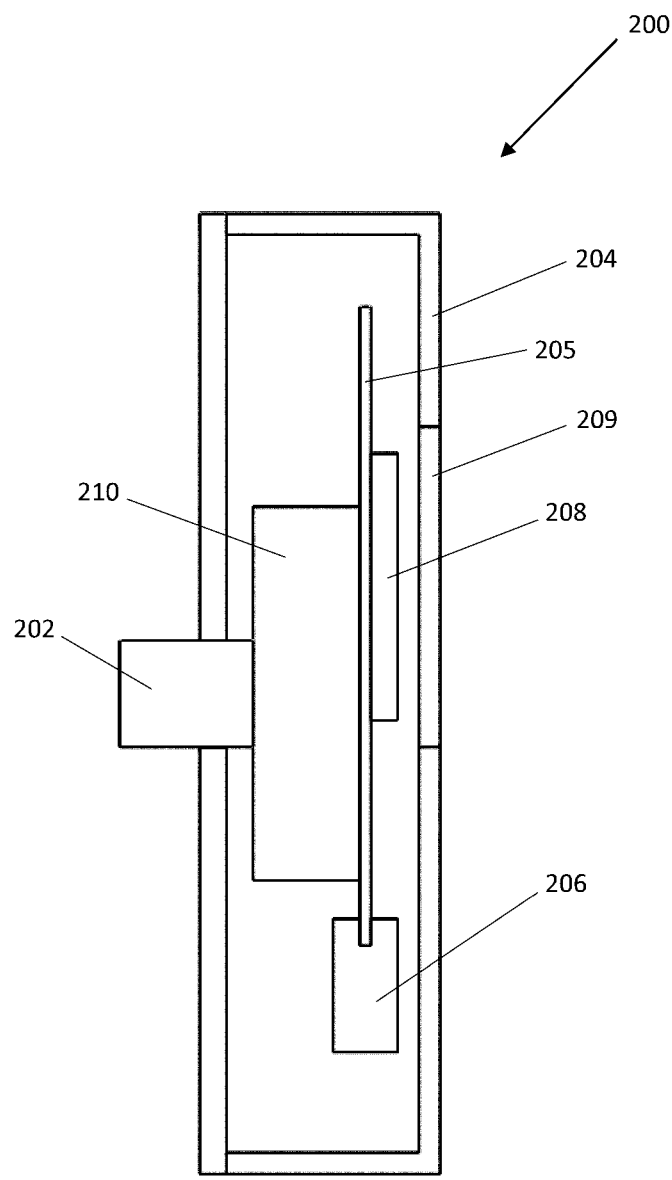
FIG. 6 is a cross section schematic illustration of an electronic distance recorder according to another embodiment of the invention.

FIG. 6 shows an illustration of an EDR 200 according to another embodiment of the invention. Many features and functions of the EDR 200 are similar or identical to those of the EDR 1. Accordingly, the ensuing description is focussed on differences. In general, concepts discussed with reference to the EDR 1 are applicable to the EDR 200 unless the context clearly requires otherwise.

EDR 200 comprises a shaft 202 for mounting the EDR 200 to the wheel hub of a vehicle. The EDR 200 also comprises a casing 204 to house the internal components of the EDR 200. The shaft 202 extends between the interior and the exterior of the casing 204. In this embodiment the shaft 202 is fixed to the casing 204. The casing 204 and the shaft 202 rotate together with the wheel hub to which the EDR 200 is mounted. In this embodiment the casing 204 is substantially sealed. However, internal parts within the casing 204 (which will be described below) are mounted within the casing 204 and able to rotate with respect to the casing 204 and the wheel hub to which the EDR 200 is mounted. An advantage of this arrangement is that the interface between the rotating parts and the stationary parts, along with any bearings facilitating the relative rotation, is within the sealed environment of the casing 204.

The EDR 200 comprises an internal chassis 205. In this embodiment the chassis 205 supports any or all of the same electronic components included in the EDR 1. In alternative embodiments the chassis 205 may comprise a different set of electronic components. The chassis may comprise a PCB (e.g. mounted thereto or integral therewith). In this embodiment the chassis 205 comprises an electronic display 208 supported thereon. The electronic display 208 may be configured to display the same information as displayed on the electronic display 8 of EDR 1 as explained above. The casing 204 comprises a window 209 through which the electronic display 208 is visible.

The chassis 205 is rotatably mounted to the internal shaft 202. The chassis 205 and all the components mounted thereon are able to rotate with respect to the shaft 202, the casing 204 and the wheel hub to which the EDR 200 is mounted. Connected to the chassis 205 at a lower end is an offset mass 206. The offset mass 206 provides a similar effect to the offset mass 6, hindering the chassis 205 from rotating as the casing 204 rotates with the wheel hub of a vehicle.

In this embodiment, the chassis 205 is mounted to the shaft 202 via a generator 210. The generator 210 may be a pancake generator. The generator 210 comprises a rotor (not shown) rotatably fixed to the shaft 202, and a stator (not shown) rotatably fixed to, or fixed with respect to, the chassis 205, the generator is configured to generate electrical power upon relative rotation between the rotor and the stator. The generator 210 in this embodiment provides the same functions as the generator formed by the stator 10 and rotor 11 in EDR 1. In this embodiment, the generator 210 charges a battery used to power the electronic components within the EDR. The same control means used to prevent excessive torque being applied to the stator of the generator, as discussed in relation to the EDR 1, may be employed in the EDR 200 in order to hinder the chassis 205 from spinning.

In some embodiments of the invention the shaft may not extend outwardly from the casing, and the casing may be mounted directly to the wheel hub or a bracket connected thereto. Likewise the generator may be connected directly to the casing rather than to an internal shaft. Alternatively the generator may comprise its own shaft connected to the casing or passing through the casing for connection to the wheel hub or a mounting bracket. Parts described as being "rotatably fixed to" may in other embodiments of the invention be "rotatably fixed with respect to". Parts that are rotatably fixed with respect to each other may be either directly or indirectly connected.

Figure 7:
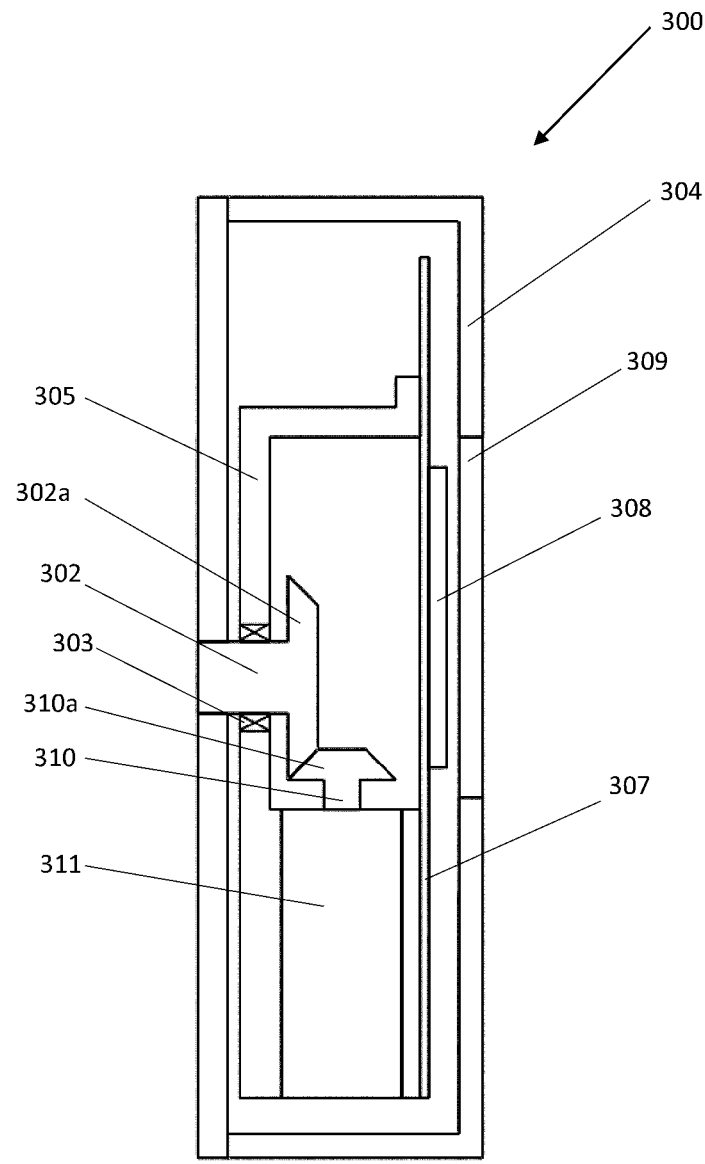
FIG. 7 is a cross section schematic illustration of an electronic distance recorder according to another embodiment invention.

FIG. 7 shows an illustration of an EDR 300 according to a further embodiment of the invention.

Similarly to the EDR 200, the EDR 300 has a drive shaft 302 rotatably fixed to a casing 304. The drive shaft 302 is configured to be fixed to a wheel hub of a vehicle. The drive shaft 302 and casing 304 therefore rotate together with the wheel as the vehicle travels. Similarly to EDR 1 and EDR 200, the casing 304 is substantially sealed. Similarly to EDR 200, since the casing 304 rotates with the drive shaft 302, the interface between the rotating and non-rotating parts of the EDR 300 is contained within the sealed enclosure of the casing 304. A shaft within the EDR that is driven by a vehicle's wheel (e.g. shaft 302 in this case) may be considered a drive shaft of the EDR.

A chassis 305 is mounted on the drive shaft 302 and is configured to rotate with respect to the drive shaft 302. In this embodiment one or more bearings 303 are provided between the shaft drive 302 and the chassis 305. An advantage of this arrangement is that the bearings between the rotating part and the non-rotating part of the EDR are not the bearings of a generator, such as in the EDR 200, and also are not provided close to a seal between the inside and outside of the casing, such as in the EDR 100. The independence of the bearings 303 from other parts means that there may be fewer constraints placed on their size and arrangement. The bearings used may be robust ball races providing ample support and strength without adding much friction to the connection between the portion of the device that rotates with the wheel and the portion of the device that remains generally stationary. Embodiments in which a generator provides the interface between the rotating and stationary parts may require a generator to be designed or specified based on its ability to support loads more so than its ability to generate power, which may reduce the options available or result in premature failure of the generator. Robust support is important in a wheel hub mounted device given the shock loading that may be experienced while the vehicle travels.

The chassis 305 supports electronic components of the EDR 300, which in this embodiment are the same electronic components as described in relation to EDR 1. The chassis 305 comprises an electronic display 308 configured to display information, such as some or all of the information described as being displayed be EDR 1 or EDR 100, such as license and/or odometer information. The casing 304 comprises a window 309. The electronic display 308 is visible through the window 309. In this embodiment the electronic display is supported on a PCB 307. Other electronic components are also supported on the PCB 307.

The chassis 305 is configured to have a centre of mass that is offset from the axis of the drive shaft 302 on which the chassis 305 is mounted. The offset centre of mass biases the chassis 305 into a rest orientation. The offset centre of mass helps hinder the chassis 305 from spinning with the drive shaft 302 and wheel hub while the vehicle travels. In this embodiment the rest orientation coincides with an orientation of the information displayed on the electronic display 308 that allows for a person to read the information substantially without tilting their head. The offset centre of mass in this embodiment is produced by asymmetric geometry of the chassis 305 and the components mounted thereon (in particular the generator 311 which is described below). In other embodiments the chassis 305 may have a distinct part connected thereto which functions as a counterweight, similar to the mass 206 of the EDR 200.

The EDR 300 comprises a generator configured to generate electrical power. The generator provides the same functions as provided by the generator in the EDR 1, e.g. charging a battery to power the electronic components and display. In this embodiment the generator comprises a stator 311 which is supported by the chassis 305. The generator comprises an input shaft 310 which when turned results in power being generated by the generator. The input shaft 310 in this embodiment is a rotor of the generator although in other embodiments the rotor (e.g. the part of the generator comprising a magnetic field or armature) may be a separate part from the input shaft 310 but configured to be driven by the input shaft 310.

In this embodiment the generator 311 is not in line with the wheel hub of the vehicle, which is a difference between EDR 300 and the EDR 1 or EDR 200. The generator 311 is driven by the drive shaft 302, and in turn, the wheel of the vehicle to which the EDR 300 is mounted. The chassis 305 comprises an open portion within which the shaft 302 is engaged with the input shaft 310 of the generator. The generator 311 is connected to the drive shaft 302 and driven by the wheel of the vehicle, by way of a geared arrangement (e.g. a gear assembly). In this embodiment the generator 311 is connected to the input shaft by bevel gears. The input shaft 310 of the generator 311 is connected to a bevel gear 310a and the drive shaft 302 is connected to a bevel gear 302a which drives the bevel gear 310a to drive the generator and produce power. The gears are coupled (e.g. meshed) to couple the shafts together. In other embodiments, different types of gears may be used. In this embodiment, the gear assembly is configured to increase angular velocity of the rotor relative to the first rotatable portion.

In this embodiment, the rotor 310 of the generator 311 has a rotation axis that is not parallel to the rotation axis of the drive shaft 302. Similarly, the rotation axis of the rotor 310 is not parallel to the axis of rotation of the wheel to which the EDR 300 is mounted in use. In this embodiment the rotation axis of the rotor 310 is oriented at a perpendicular angle to the rotation axis of the input shaft and the axis of rotation of the vehicle wheel. The rotation axis of the rotor 310 is substantially vertical when the vehicle wheel is at rest. In other embodiments the angle between these axes may be different.

The EDR 300 is an example of a vehicle information recorder comprising a generator which comprises a first rotatable portion (e.g. the shaft 302) configured to be fixedly mounted on the wheel hub of a vehicle. The first rotatable portion is configured to turn a rotor (e.g. input shaft 310) of the generator upon rotation of the wheel hub. The generator also comprises a second rotatable portion (e.g. the chassis 305) rotatably mounted to the first rotatable portion and comprising a stator 311 of the generator. The second rotatable portion has a bias towards a rest orientation (e.g. by virtue of the offset centre of the mass of the chassis 305).

Advantageously, the generator 311 is generally spaced apart from the axis of rotation of the EDR 300. This enables the generator 311 to contribute to the offset centre of mass of the chassis 305. As discussed in relation to the EDR 1, the power that can be generated depends on the torque that can be applied to the stationary portion of the EDR. Therefore, a good ability of the chassis to counteract torque that it receives when generating power results in a high power able to be generated. Furthermore, since the generator contributes to the offset weight, the overall weight of the device may be lower than in embodiments in which the generator does not contribute to an offset weight, since the weight of the generator may reduce the need for a large counterweight. Furthermore, positioning the generator away from the axis of rotation of the mounting shaft may make better use of the space inside the device and allow for a slimmer device than could be achieved if the generator was placed in line with the other components. Additionally, a generator with a rotational axis oriented in the vertical plane helps facilitate the arrangement of the PCB and electronic display facing outwards.

Another advantage of the arrangement in EDR 300 is that the use of gears enables a gear ratio to be provided between the drive shaft and the driven shaft (e.g. the rotor). If the generator operates optimally at a higher speed than the rotation of the vehicle's wheel, the gear on the drive shaft driven by the wheel may be provided with more teeth than the gear on the generator, resulting in an increased generator speed. Generators may work more efficiently when turning at higher speeds and may produce more power than at lower speeds. In other embodiments the generator may be provided at an oblique angle, or parallel, to the drive shaft of the EDR while still coupled to the drive shaft with gears and/or while still having a centre of mass offset from the rotational axis of the drive shaft and the chassis rotatably mounted thereon.

Distance Calculation Based on Generator Output Signal

Referring again to FIG. 4, the EDR 1 is configured to determine distance travelled by the vehicle based on variations in the output voltage signal of the generator. It should be understood that determining distance travelled in this context is used to mean determining an estimate of distance travelled, rather than determining the exact distance travelled with complete precision. The processor 31 in the EDR 1 receives a signal corresponding to the output voltage of the generator (for example provided directly or indirectly to the processor from the generator), and determines the number of wheel rotations from the signal. In this embodiment, as the generator in the EDR 1 produces AC output, a representative signal of which is received by the processor 31, the processor 31 determines the frequency of the AC output and calculates the rotational speed of the rotor 10, mounting shaft 3, and therefore the wheel hub, based on the detected AC frequency. An estimate of tyre circumference stored in the memory 32 of the EDR 1 can be accessed and used by the processor 31 to calculate an estimate of the distance travelled by the vehicle based on the calculated rotational speed of the wheel hub.

The particular calculation used may differ between different embodiments of the invention, and will depend on details of the particular generator design, such as the number of magnetic poles used. In some embodiments the EDR may comprise a generator configured to output DC power. In such an embodiment, the processor in the EDR determines the number of rotations of the mounting shaft based on cyclic variations in the DC output voltage. The cyclic variations may be produced by variations in potential difference depending on the angular position of the rotor relative to the stator.

While in the preferred embodiment, the EDR is configured to determine distance based on variations in the output voltage signal of a power generator, in other embodiments the EDR may comprise another type of output voltage generator. For example, the EDR may comprise a signal generator for generating an output voltage signal for the purpose of distance calculation, but not for the purpose of generating power.

In other embodiments the EDR may incorporate a separate sensor for use in determining the number of rotations of the mounting shaft 3, such as a sensor or switch configured to generate/vary a signal when a magnet mounted on the rotor 3 passes by the sensor.

Orientation of Antennas

The GPS and cellular antennas of the EDR 1 may be more effective when oriented in a particular orientation in comparison to other orientations, and their ability to receive or transmit signals may be reduced if they are spinning. For example, the ability to stabilise a GNSS antenna is advantageous as a good GNSS fix is desirable for accurate tracking and recording of position or distance. In the EDR 1, the GPS antenna and the cellular antenna are mounted such that each is in a selected communication orientation when the casing 4 is in the selected charging orientation.

In EDR 1, the positions of the GPS receiver 33 and cellular modem 36 on the casing 4 are indicated in FIGS. 4a and 4b. Both the GPS receiver 33 and cellular modem 36 are mounted so that their antennas are oriented for communication in tangential directions to the rotation of the casing 4. It may be considered more important for the antennas to communicate effectively when the vehicle is travelling than when stationary. Therefore, the antennas are mounted within the casing 4 such that in the selected charging orientation of the casing 4 shown in FIG. 4b, the GPS and cellular antennas are oriented in a suitable position. For example, the GPS receiver 33 and its antenna are oriented appropriately for satellite communication with the GPS satellites 23 (e.g. they are oriented to receive signals from above the vehicle effectively), while the cellular modem 36 and its antenna are oriented appropriately for terrestrial communication (e.g. they are oriented to receive/transmit signals horizontally from the vehicle effectively).

In controlling the orientation of the casing 4 by controlling the generator output, the EDR 1 also orients the antennas in selected communication orientations, and stabilises the antennas in their selected communication orientations at a range of vehicle speeds.

In some embodiments the EDR may comprise two GPS receiver antennas, and/or two cellular antennas, the two antennas are positioned at a selected radial angle to one another with respect to the axis of rotation of the casing 4, the selected radial angle being substantially the same as the radial angle between the selected charging orientation of the casing 4 and the rest orientation. For example, the antennas may be oriented perpendicularly to each other, so that in the rest orientation (when the vehicle is stationary) and in the selected charging orientation (when the vehicle is travelling) that is at 90° to the rest orientation of the casing 4, one of the GPS antennas, and one of the cellular antennas, is always oriented appropriately.

In some embodiments the above concept of stabilising antennas may be applied to hub mounted devices other than electronic distance recorders. For example, some embodiments of the invention provide for a communication device of a similar structure to the EDR 1. A first rotatable portion may be fixedly connected to a wheel hub, and a second rotatable portion having one or more antennas mounted thereon may be rotatably mounted to the first rotatable portion but biased into a rest position. The bias, which could be achieved with the use of an offset mass in a similar manner to that described above in relation to the embodiment shown in FIGS. 4, 5a and 5b, would substantially prevent, or at least hinder, the second rotatable portion and antennas spinning with the first rotatable portion while the vehicle travels.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

The entire disclosures of all applications, patents and publications cited above and below, if any, are herein incorporated by reference.

Reference to any prior art in this specification is not, and should not be taken as, an acknowledgement or any form of suggestion that that prior art forms part of the common general knowledge in the field of endeavour in any country in the world.

The invention may also be said broadly to consist in the parts, elements and features referred to or indicated in the specification of the application, individually or collectively, in any or all combinations of two or more of said parts, elements or features.

Where in the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the present invention.

The invention claimed is:

1. An information recorder comprising:
   a casing configured to be mounted to a wheel hub of a vehicle;
   a GNSS receiver within the casing;
   a processor within the casing configured to receive location information from the GNSS receiver and to determine at least one of a position of and a distance travelled by the vehicle based on the location information;
   a first portion fixedly mounted to the wheel hub of the vehicle in use;
   a second portion rotatably mounted to the first portion and having a bias towards a rest orientation; and
   a generator for generating power supply for the information recorder or to a power storage device configured to power the information recorder, the generator comprising:
      a rotor connected to the first portion to be turned upon rotation of the wheel hub; and
      a stator provided to the second portion;
   wherein the information recorder is configured to electronically control torque applied between the rotor and the stator when the rotor rotates relative to the stator to generate power in the generator, the information recorder configured to electronically control torque to limit rotation of the second portion from the rest orientation; and
   wherein the GNSS receiver is provided to the second portion.

2. The information recorder of claim 1, wherein the information recorder is configured to accrue a vehicle odometer value based on the distance travelled by the vehicle, the information recorder comprising an electronic display configured to display the vehicle odometer value.

3. The information recorder of claim 1, comprising a transmitter configured to transmit to a receiver the position of and/or the distance travelled by the vehicle.

4. The information recorder of claim 3, wherein the information recorder is configured to transmit with the transmitter over a wireless network to a server said at least one of the position of and the distance travelled by the vehicle.

5. The information recorder of claim 1, wherein the information recorder is configured to control the torque applied between the rotor and the stator by controlling at least one of the power generated by and the current drawn from the generator.

6. The information recorder of claim 1,
   wherein the information recorder is configured to adjust the torque applied between the rotor and the stator to allow the second portion to rotate towards a selected charging orientation.

7. An information recorder comprising:
   a casing configured to be mounted to an exterior of a wheel hub of a vehicle;
   a generator for generating power supply for the information recorder or to a power storage device configured to power the information recorder;
   a processor within the casing configured to determine at least one of a position of and a distance travelled by the vehicle; and
   a transmitter configured to actively transmit to a receiver said at least one of the position of and the distance travelled by the vehicle;
   a first portion fixedly mounted to the wheel hub of the vehicle in use; and
   a second portion rotatably mounted to the first portion and having a bias towards a rest orientation;
   wherein the transmitter is provided to the second portion; and
   wherein the generator comprises:
      a rotor connected to the first portion to be turned upon rotation of the wheel hub; and
      a stator provided to the second portion;
   wherein the information recorder is configured to electronically control torque applied between the rotor and the stator when the rotor rotates relative to the stator to generate power in the generator, the information recorder configured to electronically control torque to limit rotation of the second portion from the rest orientation.

8. The information recorder of claim 7, wherein the information recorder is configured to transmit with the transmitter over a wireless network to a server said at least one of the position of and the distance travelled by the vehicle.

9. The information recorder of claim 7, wherein the transmitter comprises a cellular modem.

10. The information recorder of claim 7, further comprising a GNSS receiver, wherein the processor is configured to receive location information from the GNSS receiver and to determine said at least one of the position of and distance travelled by the vehicle.

11. The information recorder of claim 7, wherein the information recorder is configured to adjust to torque applied between the rotor and the stator to allow the second portion to rotate towards a selected charging orientation.

12. An information recorder comprising:
   a processor configured to determine at least one of a position of and a distance travelled by a vehicle; and
   a generator for generating power supply for the information recorder or to a power storage device configured to power the information recorder, the generator comprising:
      a rotor;
      a first portion fixedly mounted to a wheel hub of the vehicle in use, the rotor being connected to the first portion to be turned upon rotation of the wheel hub; and
      a second portion rotatably mounted to the first portion and comprising a stator, the second portion having a bias towards a rest orientation,
   wherein the information recorder is configured to electronically control torque applied between the rotor and the stator when the rotor rotates relative to the stator to generate power in the generator, the information recorder configured to electronically control torque to limit rotation of the second portion from the rest orientation.

13. The information recorder of claim 12, wherein the first portion comprises a casing of the information recorder and a shaft extending into an interior of the casing.

14. The information recorder of claim 13, wherein the second portion comprises a chassis rotatably mounted on the shaft.

15. The information recorder of claim 12, wherein the rotor is fixedly coupled to the first portion.

16. The information recorder of claim 12, wherein the rotor is coupled to and driven by the first portion.

17. The information recorder of claim 12, wherein the information recorder is configured to control the torque applied between the rotor and the stator by controlling at least one of the power generated by and the current drawn from the generator.

18. The information recorder of claim 12, wherein the information recorder is configured to adjust the torque applied between the rotor and the stator to allow the second portion to rotate towards a selected charging orientation.

19. The information recorder of claim 18, wherein in the selected charging orientation, the second portion is rotated substantially 90 degrees from the rest orientation.

* * * * *